United States Patent
Ionescu et al.

(10) Patent No.: US 10,025,922 B2
(45) Date of Patent: Jul. 17, 2018

(54) USER-MODE COMPONENT INJECTION AND ATOMIC HOOKING

(71) Applicant: CrowdStrike, Inc., Irvine, CA (US)

(72) Inventors: Ion-Alexandru Ionescu, Seattle, WA (US); Loren C. Robinson, West Deptford, NJ (US)

(73) Assignee: CrowdStrike, Inc., Irvine, CA (US)

( * ) Notice: Subject to any disclaimer, the term of this patent is extended or adjusted under 35 U.S.C. 154(b) by 98 days.

(21) Appl. No.: 14/818,527

(22) Filed: Aug. 5, 2015

(65) Prior Publication Data
US 2017/0039366 A1    Feb. 9, 2017

(51) Int. Cl.
*G06F 21/52* (2013.01)
*G06F 9/54* (2006.01)
*G06F 21/55* (2013.01)

(52) U.S. Cl.
CPC .............. *G06F 21/52* (2013.01); *G06F 9/545* (2013.01); *G06F 21/55* (2013.01); *G06F 2221/034* (2013.01)

(58) Field of Classification Search
CPC .... G06F 21/52; G06F 9/545; G06F 2221/034; G06F 21/55
USPC .......................................................... 726/22
See application file for complete search history.

(56) References Cited

U.S. PATENT DOCUMENTS

| | | | | |
|---|---|---|---|---|
| 5,778,226 A | * | 7/1998 | Adams | G06F 13/102 710/5 |
| 6,438,621 B1 | * | 8/2002 | Kanamori | G06F 9/44521 711/209 |
| 6,823,460 B1 | * | 11/2004 | Hollander | G06F 9/4425 710/260 |
| 8,214,900 B1 | * | 7/2012 | Satish | G06F 21/554 726/23 |

(Continued)

FOREIGN PATENT DOCUMENTS

WO    WO-2008008401 A2 * 1/2008 ........... G06F 21/554

OTHER PUBLICATIONS

Extended European Search Report dated Dec. 12, 2016 for European Patent Application No. 16179596.8, 6 pages.

(Continued)

*Primary Examiner* — Eleni A Shiferaw
*Assistant Examiner* — Sakinah White Taylor
(74) *Attorney, Agent, or Firm* — Lee & Hayes, PLLC

(57) ABSTRACT

Techniques are described herein for loading a user-mode component associated with a kernel-mode component based on an asynchronous procedure call (APC) built by the kernel-mode component. The APC is provided to the main thread of a user-mode process while that user-mode process loads, causing the user-mode process to load the user-mode component. The APC also causes allocation of memory at a location adjacent to that of the user-mode process and stores instructions at the allocated memory. The user-mode component then atomically hooks function(s) of the user-mode (Continued)

process, including modifying a single instruction or set of instructions of the function(s) to jump to the allocated memory. When that modified instruction is executed and jumps to the allocated memory, the instructions at the allocated memory request loading of the user-mode component, which receives data from the hooked function. The user-mode component then provides that data to the kernel-mode component.

18 Claims, 6 Drawing Sheets

(56) References Cited

U.S. PATENT DOCUMENTS

| | | | |
|---|---|---|---|
| 8,572,729 B1* | 10/2013 | Lowe | G06F 21/53 710/260 |
| 8,752,049 B1* | 6/2014 | Backensto | G06F 11/1479 714/13 |
| 9,336,047 B2* | 5/2016 | Busaba | G06F 9/467 |
| 2004/0237071 A1 | 11/2004 | Hollander et al. | |
| 2006/0075381 A1 | 4/2006 | Laborczfalvi et al. | |
| 2007/0209032 A1 | 9/2007 | Mihai et al. | |
| 2007/0250927 A1 | 10/2007 | Naik | |
| 2008/0016314 A1* | 1/2008 | Li | G06F 21/554 711/200 |
| 2009/0296685 A1* | 12/2009 | O'Shea | H04L 69/32 370/351 |
| 2010/0083275 A1 | 4/2010 | Jayamohan et al. | |
| 2010/0095281 A1 | 4/2010 | Raber | |
| 2010/0138843 A1* | 6/2010 | Freericks | G06F 9/542 719/318 |
| 2014/0137184 A1* | 5/2014 | Russello | G06F 21/60 726/1 |
| 2015/0378896 A1* | 12/2015 | Greiner | G06F 12/084 711/130 |
| 2017/0039367 A1 | 2/2017 | Ionescu et al. | |

OTHER PUBLICATIONS

Mandt, "Kernel Attacks through User-Mode Callbacks", retrieved on Nov. 24, 2016 at <<http://mista.nu.research/mandt-win32k-slides.pdf>>, Feb. 11, 2011, 108 pages.

Partial European Search Report dated May 2, 2017 for European Patent Application No. 17158611.8, 14 pages.

Hunt, et al., "Detours: Binary Interception of Win32 Functions", retrieved on Aug. 31, 2000 at <<ftp://ftp.research.microsoft.com/pub/tr/tr-98-33.pdf>>, 1999, pp. 1-9.

Extended European Search Report dated Aug. 22, 2017 for European Patent Application No. 17158611.8, 12 pages.

Office action for U.S. Appl. No. 15/077,526, dated Nov. 1, 2017, Ionescu, "User-Mode Component Injection Techniques", 37 pages.

* cited by examiner

USER-MODE COMPONENT INJECTION AND ATOMIC HOOKING

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

To aid in countering such threats, vendors of anti-virus software will often register hooks with an operating system of a monitored device or hook system library components (e.g., the NTDLL component in Windows operating systems, or glibc component on UNIX Systems) implemented in processes of the monitored device. Vendors of anti-virus software typically operate in user-mode, however, and cannot hook components implemented in processes until those processes are loaded. This delay provides security exploits with an opportunity to insert themselves into such processes and harden against detection by anti-virus software. Further, advances in operating systems, such as advances from 32-bit operating systems to 64-bit operating systems, may hinder the ability of anti-virus software to hook functions of certain components, such as 64-bit versions of system kernel-mode components.

Hooking processes also can involve difficulties. The component hooking a process may have to deal with race conditions and be required to use thread suspension techniques in order to safely hook a function in such a process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for a kernel-mode component to inject a user-mode component that atomically hooks a component of a user-mode process and provides data associated with that hook to the kernel-mode component. The component atomically hooked by the user-mode component may be a system library component instantiated by the user-mode process, such as a 64-bit loader/initialization library, such as the NTDLL component on Windows operating systems. The injection may involve the kernel-mode component building an asynchronous procedure call (APC) and providing the APC to the dispatcher of operating system in order to cause user-mode process execution. When executed, a user routine of the APC calls instructions of the user-mode loader library component which requests that the loader of the user-mode process load the user-mode component. The user-mode component may atomically hook the component of the user-mode process by modifying a single machine-word sized instruction, or a set of instructions that make up a machine word, (e.g., an 8 byte instruction on a 64-bit machine) in a function of the component to jump to a location in memory specified as an offset with a subset of the bytes comprising the single instruction. The memory at the location may be allocated by a kernel routine of the APC, which may also store instructions (e.g., a thunk) at the location. Once the modified instruction jumps to the location, the instructions at the location in turn jump to the user-mode component, which receives data associated with the hook (e.g., arguments of the function) and provides that data to the kernel-mode component. Thus, the user-mode component injection and atomic hook effectively enable a kernel-mode component to hook a component of the user-mode process. Such hooking may enable the kernel-mode component to obtain information about user-mode memory allocations, actors which set thread contexts in user-mode, or any system calls which cannot be directly hooked from within kernel-mode.

As used herein, "APC" may refer to APCs, to signals used in a Unix OS, or to any function pointer or pointers built in kernel mode and provided to a user-mode process or thread for execution.

Example Environment

Figure 1:
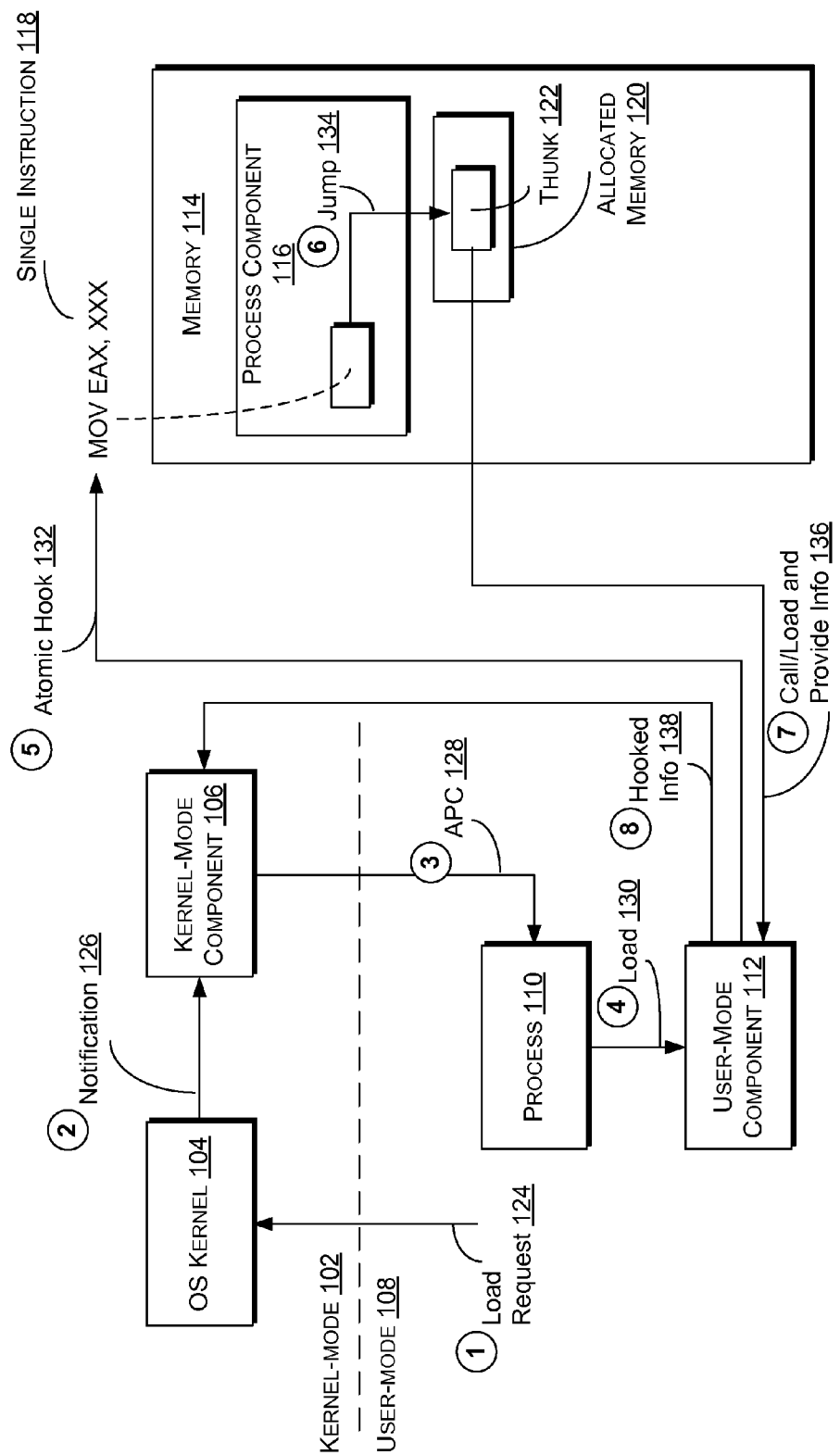
FIG. 1 illustrates an overview of multiple executable components and storage locations of components in memory, the multiple executable components including a kernel-mode component, a user-mode component, and a user-mode process, the kernel-mode component being configured to cause the user-mode process to load the user-mode component and to allocate memory adjacent to a specific component in the user-mode process, the adjacent memory enabling the user-mode component to atomically hook the user-mode process.

FIG. 1 illustrates an overview of multiple executable components and storage locations of components in memory, the multiple executable components including a kernel-mode component, a user-mode component, and a user-mode process, the kernel-mode component being configured to cause the user-mode process to load the user-mode component and allocate memory adjacent to a specific component in the user-mode process, the adjacent memory enabling the user-mode component to atomically hook the user-mode process. As illustrated, multiple components may run in kernel-mode 102 of a computing device, such as an operating system (OS) kernel 104 and a kernel-mode component 106. Multiple components may also run in user-mode 108 of the computing device, such as a process 110 and a user-mode component 112. Memory 114 of the computing device may also store one or more of such components, such as a process component 116 of the process 110. Process component 116 includes one or more functions with different instructions, such as single instruction 118. Also, adjacent to process component 116 in memory 114, a portion of allocated memory 120 may store a thunk 122.

As is further illustrated in FIG. 1, the OS kernel 104 may receive 124 a load request for the process 110. The kernel-mode component 126 may then receive 126 a notification of the load request from the OS kernel 104, build an APC, and queues 128 the APC to the main thread of process 110 for execution. When executed, the APC calls instructions which allocate the memory 120, store the thunk 122 in the memory 120, and load 130 the user-mode component 112. The user-mode component 112 then atomically hooks 132 the single instruction or set of instructions, replacing the instruction 118. When that single instruction 118 is subsequently executed after modification, it jumps 134 to the allocated memory, causing execution of the thunk 122. The thunk 122 then jumps to or requests loading 136 of the user-mode component 112, which receives data from the function associated with the hooked single instruction 118. The user-mode component 112 then provides 138 the hooked data to the kernel-mode component 106.

Figure 2:
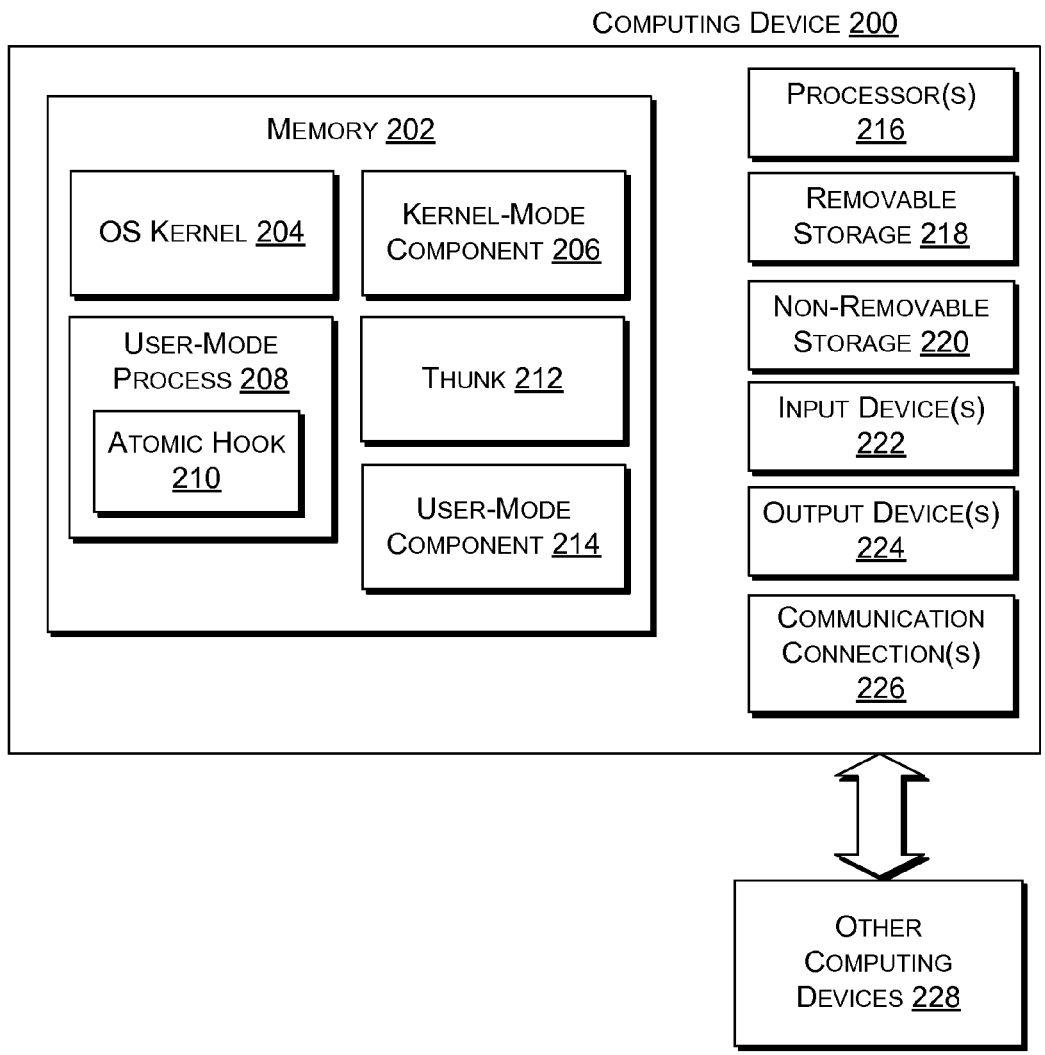
FIG. 2 illustrates a component level view of a computing device configured with a kernel-mode component capable of injecting a user-mode component to hook a user-mode process.

In various embodiments, a computing device may include the OS kernel 104, kernel-mode component 106, process 110, user-mode component 112, and memory 114. Such a computing device may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the OS kernel 104, kernel-mode component 106, process 110, user-mode component 112, and memory 114 may be distributed among the multiple computing devices. In some implementations, the computing device represents one or more virtual machines implemented on one or more computing devices. An example of a computing device including the OS kernel 104, kernel-mode component 106, process 110, user-mode component 112, and memory 114 is illustrated in FIG. 2 and described below with reference to that figure.

The OS kernel 104 may be a kernel of any sort of OS, such as a Windows® OS, a Unix OS, or any other sort of OS. Such an OS may be a 64-bit OS or greater and may support both 32-bit processes and 64-bit processes with a 64-bit system library loader component, such as the 64-bit NTDLL component on Windows operating systems. The OS kernel 104 may have load and unload functions for loading and unloading components, such as the process 110. The OS kernel 104 also includes a number of computing device lists, such as a list of known library components (e.g., known dynamic link libraries (DLLs)).

The kernel-mode component 106 may be a component of a kernel-level security agent, which may monitor and record activity on the computing device, may analyze the activity, and may generate alerts and events and provide those alerts and events to a remote security service. The kernel-level security agent may be installed and configurable by the remote security service, receiving, and applying while live, reconfigurations of the kernel-mode component 106 and other component(s) of the kernel-level security agent. The kernel-mode component 106 may be an actor component within an architecture of the kernel-level security agent and receive notification of a request to load the process 110 via an event source of the architecture of the kernel-level security agent, which may register with a callback interface of the OS kernel 104. An example kernel-level security agent is described in greater detail in U.S. patent application Ser. No. 13/492,672, entitled "Kernel-Level Security Agent" and filed on Jun. 8, 2012, which issued as U.S. patent number on May 26, 2015. As is described further herein, the kernel-mode component 106 receives notification of a request to load process 110, builds an APC, queues the APC to the main thread of process 110, and receives hooked data from the user-mode component 112.

In some implementations, the process 110 may be any sort of user-mode process of a computing device, such as an application or user-mode platform component. The process 110 may perform various operations, including various system calls, such as memory allocations or setting thread contexts. The process 110 may also instantiate one or more system library components for the purpose of performing system calls. For example, if the process 110 is a 64-bit process, the process 110 may instantiate the 64-bit NT DLL on Windows operating systems. If the process is a 32-bit process, the process 110 may instantiate both a 32-bit system call library and a 64-bit system call library. The process component 116 may be an example of such a system library component, such as the 64-bit NT DLL on Windows operating systems. The process component 116 may have one or more functions, such as functions for performing user-mode memory allocations. These functions may be comprised of instructions, such as the single instruction 118 or a set of instructions that make up a machine word (8 byte instructions, for example). The process 110 may also be configured to request pending APC delivery while loading and to cause the operating system to execute those APCs.

In various implementations, the user-mode component 112 may be any sort of component associated with the kernel-mode component 106. For example, the user-mode component 112 may be a library component, such as a DLL, configured for loading by a loader of a user-mode process, such as process 110. The user-mode component 112 may be stored anywhere in memory 114. The user-mode component 112 may also be associated with a name, and the kernel-mode component 106 may add a name of that user-mode component 112 to a list of library components (e.g., Known DLLs on Windows) maintained by the OS kernel 104. As is further mentioned herein, the user-mode component 112 may atomically hook functions of process component 116, receive hooked data, provide the hooked data to the kernel-mode component 106, and restore the single instruction 118 to its pre-modified state (of one or multiple instructions comprising a machine word).

The memory 114, including allocated memory 120, may be memory of any sort of memory device. Memory may have a fairly large address space (e.g., 128 terabytes). Examples of memory 114 are illustrated in FIG. 2 and described below in detail with reference to that figure.

In some implementations, the thunk 122 may be any set of instructions that redirects to, calls, or requests loading of the user-mode component 112.

In various implementations, the OS kernel 104 may receive 124 a load request to load process 110 from a process or component of the computing device. Upon receiving 124 the load request, the OS kernel 104 may begin to load the process 110 and provide, via a callback interface of the OS kernel 104, notifications to any processes or components registered with that callback interface. As mentioned above, the kernel-mode component 106 may be registered with the callback interface of the OS kernel 104 to receive 126 notification of load requests for loading user-mode processes. Thus, the kernel-mode component 106 may receive 126 notification of the load request for loading process 110.

Upon receiving 126 the notification, the kernel-mode component 106 may build an APC for executing in the main thread of the process 110. This APC may hook functions and process components 116. The functions and process components 116 selected may be specified by a configuration of the kernel-mode component 106 or determined by, e.g., machine learning techniques. For each function, a single instruction or set of instructions that are machine-word sized to be atomically hooked may be identified. Again, identification of such instructions may be accomplished via the configuration of the kernel-mode component 106 or via machine learning techniques. The kernel-mode component 106 then identifies the locations of these functions in memory 114.

In building the APC for the main thread in a given process component, such as process component 116, the kernel-mode component 106 may specify a kernel routine of the APC. The kernel routine may call instructions of the kernel-mode component 106 for allocating memory 120. The allocated memory 120 may be within a range from the determined memory location of the given function (e.g., within a 2 gigabyte range), that range determined by the number of bytes of the single instruction 118 of the given function utilized in specifying an offset. The kernel routine may further call instructions of the kernel-mode component 106 to store instructions, such as thunk 122, at the allocated memory 120.

In addition to specifying the kernel routine of the APC, the kernel-mode component 106 may specify a user routine. When executed by the OS kernel APC dispatcher inside process 110, the user routine may call instructions of the user-mode system library loader for requesting loading of the user-mode component 112.

In some implementations, after building the APC, the kernel-mode component 106 may queue 128 the APC to the main thread of process 110 via the OS kernel 104. While loading, the user-mode loader library component in process 110 may ask the OS kernel 104 whether there are any pending APCs, and may receive the APC built by the kernel-mode component 106. Upon receiving the APC, the OS kernel 104 may execute the kernel routine and user routine of the APC inside process 110. In various implementations, the kernel-mode component 106 may accomplish different security objectives specified by a configuration of the kernel-mode component 106 by controlling when the APC is provided or the manner in which the kernel routine and the user routine of the APC execute. In some implementations, the APC may be provided at different times in the loading of the process 110.

Upon receiving an APC, the main thread of the user-mode process 110 may execute the APC, first executing the kernel routine and then executing the user routine. As mentioned, the kernel routine calls instructions of the kernel-mode component 106, which allocate memory 120 and store thunk 122 at that allocated memory. The user routine calls instructions of the user-mode loader component, which requests that the loader of the user-mode process 110 load the user-mode component 112. Upon receiving that load request, the loader of the user-mode process 110 loads the user-mode component 112. In various implementations, the user routine may simply identify the user-mode component 112 by its name, and upon encountering the identification, a check is performed to determine whether the user-mode component 112 is a known DLL included in a list of known DLLs. Because the kernel-mode component 106 will have previously added the user-mode component 112 to the list of known DLLs, the answer will be affirmative, and the user-mode loader component will load the user-mode component 112. The thread in user-mode process 110 may repeat APC execution for each APC received.

In various implementations, when loaded, the user-mode component 112 atomically hooks 132 one or more functions of the process component 116 by modifying a single instruction or set of instructions that make up a machine word 118 for each of the one or more functions. The single or multiple instructions 118 may total exactly 8 bytes, and the modifications may comprise replacing all of the 8 bytes with a jump command and an offset. If for example, 4 bytes are used for the offset in an instruction 118, the jump may be to a memory location within 2 gigabytes of the location of that instruction 118. The bytes replaced may be stored by the user-mode component 112 to enable restoration. The offset for each instruction 118 may be determined by the kernel-mode component 106 and may correspond to allocated memory 120 associated with that instruction 118. To modify an instruction 118, the user-mode component 112 may utilize an atomic compare and swap mechanism of the processor of the computing device to verify that the instruction 118 matches the instruction(s) identified by the kernel-mode component and to prevent concurrent modification of the instruction(s).

In some implementations, following the loading of the user-mode process 110, the user-mode process 110 may execute. While executing, the user-mode process 110 may invoke the modified instruction 118 of the process component 116. The modified instruction performs the jump 134 to the allocated memory 120 based on the specified offset. Upon jumping to the allocated memory 120, the thunk 122 stored at that allocated memory 120 is executed.

The user-mode component 112, upon being called by the thunk 122 or loaded at the request of the thunk 122, receives 136 data associated with the hooked function. Upon receiving the data, the user-mode component 112 may provide 138 the data to the kernel-mode component 106 for further processing.

In various implementations, the user-mode component 112 may restore the instruction 118 to its original state when the user-mode component 112 is unloading.

Example System

FIG. 2 illustrates a component level view of a computing device configured with a kernel-mode component capable of injecting a user-mode component to hook a user-mode process. As illustrated, computing device 200 comprises a memory 202 storing an OS kernel 204, a kernel-mode component 206, user-mode process 208 with a function to receive an atomic hook 210, a thunk 212, and a user-mode component 214. Also, computing device 200 includes processor(s) 216, a removable storage 218 and non-removable storage 220, input device(s) 222, output device(s) 224 and communication connections 226 for communicating with other computing devices 228.

In various embodiments, memory 202 is volatile (such as RAM), non-volatile (such as ROM, flash memory, etc.) or some combination of the two. The OS kernel 204 may be a kernel of any sort of OS, such as the OS kernel 104 described above in detail with respect to FIG. 1. The kernel-mode component 206 may be an example of the kernel-mode component 106 described above in detail with respect to FIG. 1. The user-mode process 208 may be an example of the process 110 described above in detail with respect to FIG. 1. The atomic hook 210 may be an example of the single instruction or set of instructions that make up a machine word 118 as atomically hooked at 132 by the user-mode component 112, described above in detail with respect to FIG. 1. The thunk 212 may be an example of the thunk 122 described above in detail with respect to FIG. 1. The user-mode component 214 may be an example of the user-mode component 112 described above in detail with respect to FIG. 1.

In some embodiments, the processor(s) 216 is a central processing unit (CPU), a graphics processing unit (GPU), or both CPU and GPU, or other processing unit or component known in the art.

Computing device 200 also includes additional data storage devices (removable and/or non-removable) such as, for example, magnetic disks, optical disks, or tape. Such additional storage is illustrated in FIG. 2 by removable storage 218 and non-removable storage 220. Non-transitory computer-readable media may include volatile and nonvolatile, removable and non-removable tangible, physical media implemented in technology for storage of information, such as computer readable instructions, data structures, program modules, or other data. System memory 202, removable storage 218 and non-removable storage 220 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 200. Any such non-transitory computer-readable media may be part of the computing device 200.

Computing device 200 also has input device(s) 222, such as a keyboard, a mouse, a touch-sensitive display, voice input device, etc., and output device(s) 224 such as a display, speakers, a printer, etc. These devices are well known in the art and need not be discussed at length here.

Computing device 200 also contains communication connections 226 that allow the computing device 200 to communicate with other computing devices 228.

Example Processes

FIGS. 3-6 illustrate example processes 300, 400, 500, and 600. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3:
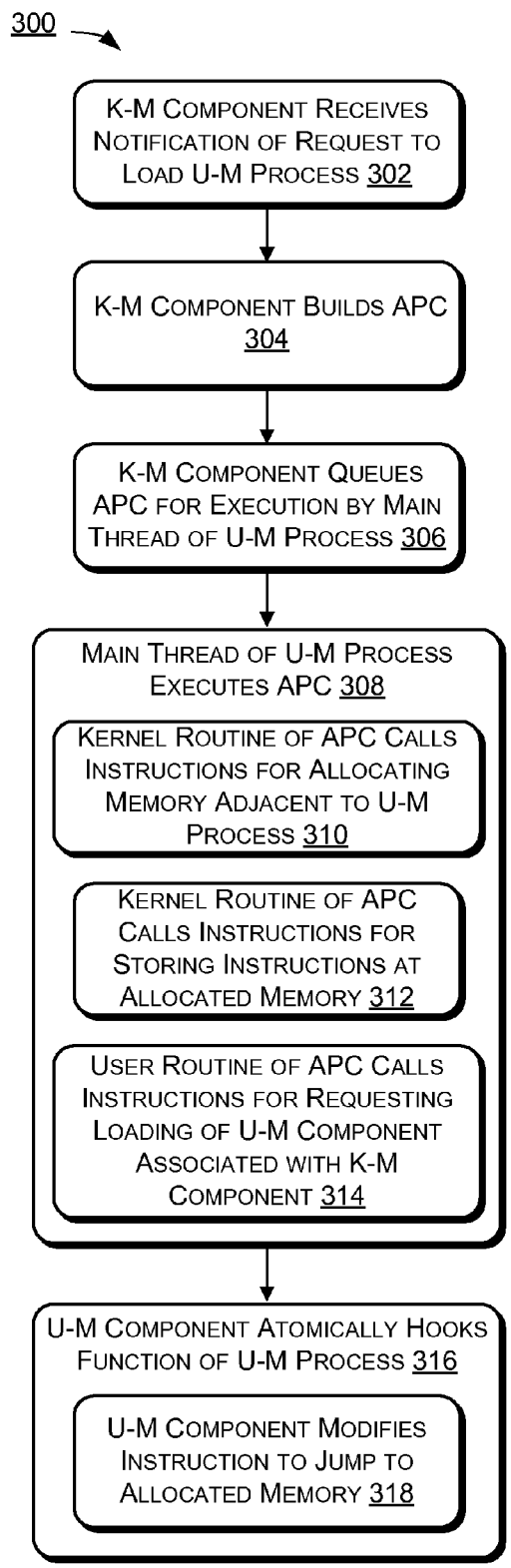
FIG. 3 illustrates an example process for a kernel-mode component to inject a user-mode component through an asynchronous procedure call (APC), the user-mode component atomically hooking a function of a user-mode process.

FIG. 3 illustrates an example process for a kernel-mode component to inject a user-mode component through an APC, the user-mode component atomically hooking a function of a user-mode process. The process 300 includes, at 302, receiving, by a kernel-mode component, notification of loading of a user-mode process. The kernel-mode component may receive the notification from a callback interface of an operating system kernel of the computing device implementing the kernel-mode component.

At 304, the kernel-mode component may build an APC to be executed by the main thread of the user-mode process while the user-mode process is loading. The APC may include a kernel routine and a user routine. The kernel routine may call instructions of the kernel-mode component for allocating a portion of memory at a location adjacent to the user-mode process in memory and for storing in the allocated portion instructions for requesting loading of the user-mode component. Such stored instructions may be a thunk. The user routine may call instructions of the user-mode loader library component for requesting loading of the user-mode component.

At 306, the kernel-mode component may queue an APC to the main thread of the user-mode process for execution. The APC may be provided when the user-mode process, as part of loading, checks whether there are any APCs for the user-mode process to run. The timing of the providing may be set to a specified stage in the loading of the user-mode process.

At 308, the main thread of the user-mode process executes the APC. At 310, executing the APC first involves invoking the kernel routine of the APC for allocating memory adjacent to the user-mode process in memory. At 312, executing the APC second involves invoking the kernel routine of the APC storing instructions at the allocated memory location. At 314, executing the APC third involves invoking the user routine of the APC for requesting loading of the user-mode component. The user-mode component may be included in a list of known library components (e.g., known DLLs).

At 316, the user-mode component then atomically hooks a function of the user-mode process, such as a function of a 64-bit system library component of the process. The function may be associated with one of a user-mode memory allocation, setting a thread context in user-mode, or any system call which cannot be hooked from kernel-mode. At 318, the atomic hooking includes modifying a single instruction, or set of machine-word sized instructions of the function to specify a jump to a memory location corresponding to an offset, the memory location being the allocated memory location. The instruction(s) may, in some implementations, be identified by the kernel-mode component based, e.g., on a configuration or on machine learning. The instruction(s) may be total eight bytes and may be modified by using an atomic compare and swap mechanism of a processor. Also, in some implementations, the location of the allocated memory at 310 may be within a range determined based on an amount of the eight bytes used to specify the offset.

Figure 4:
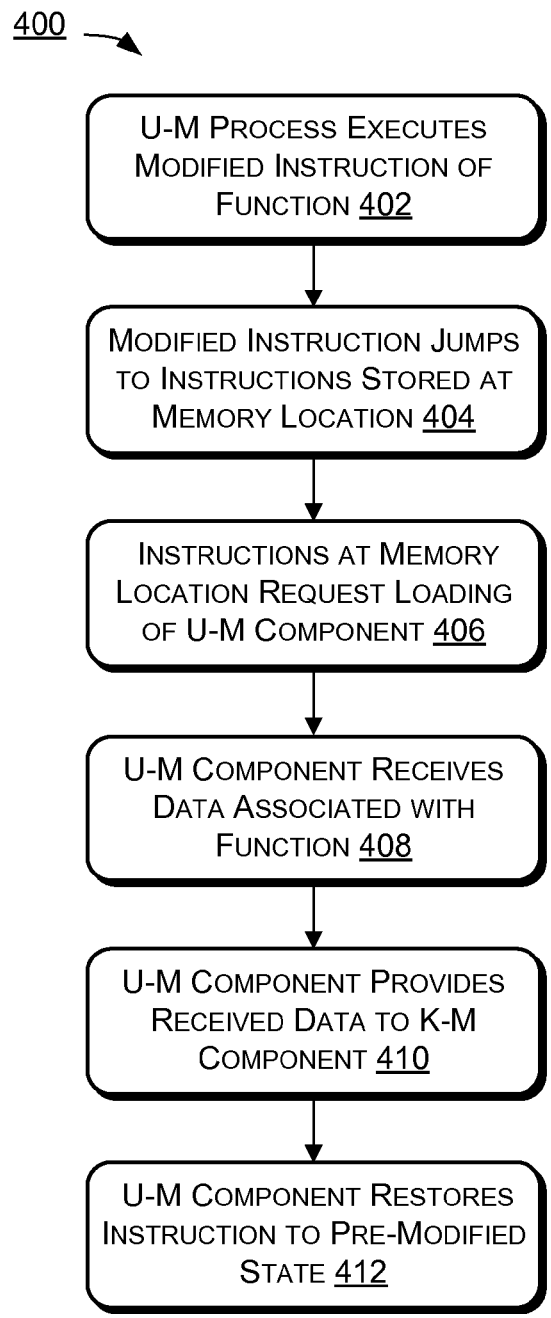
FIG. 4 illustrates an example process for a user-mode component to receive data associated with a function of a user-mode process through an atomic hook of that function and to provide the hooked data to a kernel-mode component.

FIG. 4 illustrates an example process for a user-mode component to receive data associated with a function of a user-mode process through an atomic hook of that function and to provide the hooked data to a kernel-mode component. The process 400 includes, at 402, the user-mode process executing a modified instruction of the function, the modified instruction serving as the atomic hook. The function may be a function of a 64-bit system library component of the user-mode process.

At 404, when executed, the modified instruction jumps to instructions stored at a location in memory adjacent to the user-mode process. As mentioned above, such instructions may be a thunk. The thunk may request a loader of the user-mode process to load the user-mode component.

At 406, the instructions stored in the memory location request loading of the user-mode component or jump to a loaded instance of the user-mode component.

At 408, the user-mode component receives data associated with the hooked function.

At 410, the user-mode component provides the received data to a kernel-mode component that is associated with the user-mode component.

At 412, when unloading, the user-mode component restores the modified instruction to its original state.

Figure 5:
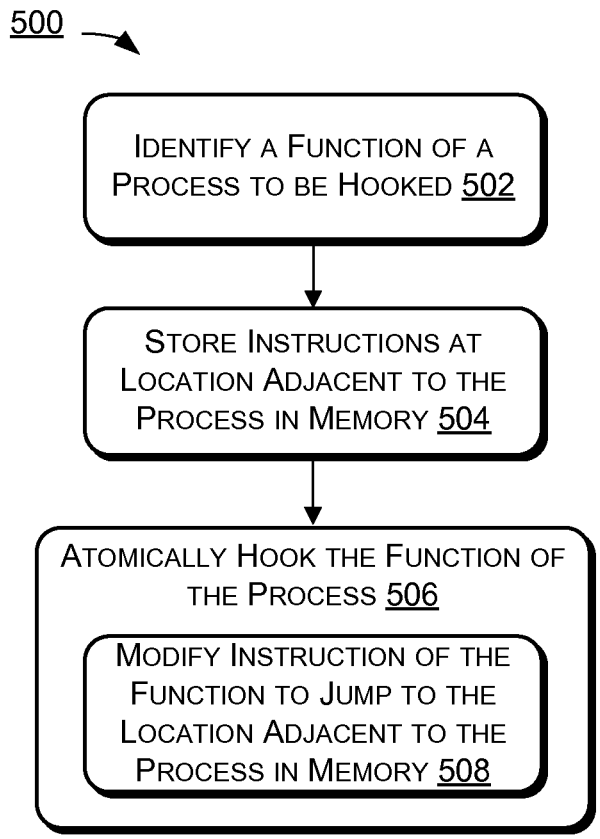
FIG. 5 illustrates an example process for atomically hooking a function of a user-mode process.

FIG. 5 illustrates an example process for atomically hooking a function of a user-mode process. The process 500 includes, at 502, identifying, by a computing device, a function of a process to be hooked. The function may be a function of a 64-bit system library component of the process.

At 504, the computing device stores instructions at a location adjacent to the process in memory.

At 506, the computing device atomically hooks the function, including, at 508 modifying a single instruction or set of instructions within a machine-sized word associated with the function to jump to the location adjacent to the process in memory to cause execution of the instructions. Execution of the instructions acquires data associated with the function to send to the kernel-mode component.

Figure 6:
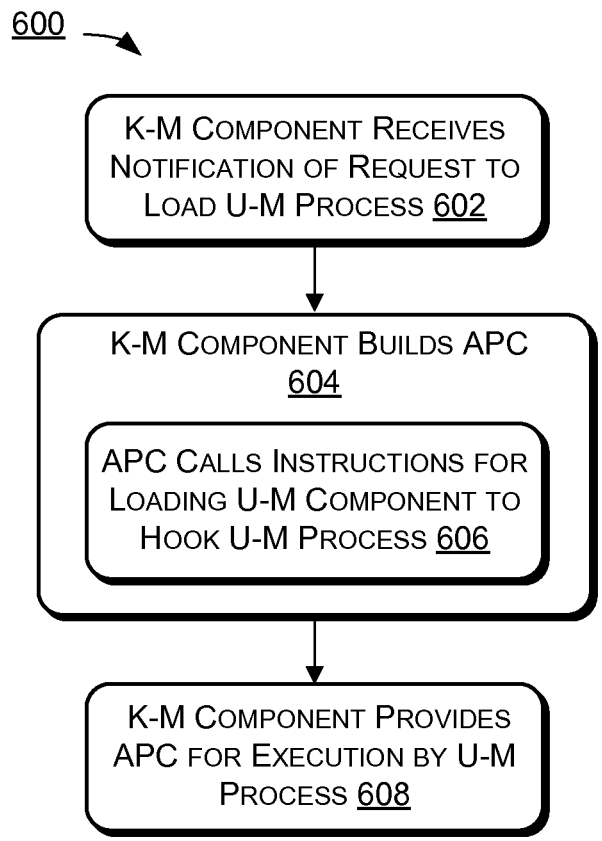
FIG. 6 illustrates an example process for a kernel-mode component to inject a user-mode component through an APC.

FIG. 6 illustrates an example process for a kernel-mode component to inject a user-mode component through an APC. The process 600 includes, at 602, receiving, by the kernel-mode component, notification of a request to load a user-mode process.

At 604, the kernel-mode component builds an APC to be executed by the user-mode process while loading, the APC including, at 606, function pointers to instructions for loading a user-mode component and enabling the user-mode component to hook a function or functions in the user-mode process. The function or functions may be a part of a 64-bit system library component of the process.

At 608, the kernel-mode component provides the APC to the user-mode process.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a processor; and
memory coupled to the processor, the memory storing:
a kernel-mode component configured to be operated by the processor to execute in a kernel-mode of the system, to monitor activity on the system as part of a security service, and to receive notification of loading of a user-mode process by the system, to build an asynchronous procedure call (APC) to be executed by a main thread of the user-mode process, and to queue the APC to the main thread of the user-mode process; and
a user-mode component associated with the kernel-mode component and configured to be operated by the processor to execute in a user-mode of the system, and to hook a function of the user-mode process,
wherein the APC includes:
a kernel routine which calls instructions for allocating a portion of the memory at a location adjacent to the user-mode process and for storing, in the allocated portion of the memory, first instructions for requesting loading of the user-mode component, and
a user routine which calls second instructions for requesting loading of the user-mode component to hook the function,
wherein the user-mode component, when loaded responsive to the user routine, hooks the function by modifying a single instruction or set of machine-sized instructions associated with the function to generate a modified instruction of the function to jump to the location adjacent to the user-mode process, wherein the single instruction or the set of machine-sized instructions are a number of bytes and are enabled using an atomic compare and swap mechanism of the processor to hook the function, and wherein the location adjacent to the user-mode process in the memory is within a range determined based on an amount of the number of bytes used to specify an offset, and
wherein the modified instruction of the function, when executed, performs the jump, which results in executing the first instructions for requesting loading of the user-mode component to receive data associated with the function and to provide the data to the kernel-mode component for purposes of monitoring, by the kernel-mode component, the activity on the system as part of the security service.

2. The system of claim 1, wherein the function is associated with one of a user-mode memory allocation, setting a thread context in user-mode, or any system call which cannot be hooked from the kernel-mode.

3. The system of claim 1, wherein the function is a function of a 32-bit system library component of the user-mode process on 32-bit devices, or a 64-bit system library component of the user-mode process on 64-bit devices.

4. A computer-implemented method comprising: identifying a function of a user-mode process to be hooked;
building, by a kernel-mode component that executes in a kernel-mode of a computing device. an asynchronous procedure call (APC), the APC including:
a kernel routine which calls instructions for allocating a part of memory of the computing device at a location adjacent to the user-mode process in the memory, and which calls instructions for storing instructions as stored instructions at the location adjacent to the user-mode process in the memory; and
a user routine which calls instructions, different from the stored instructions, for requesting loading of a user-mode component for hooking the function by modifying a single instruction or a set of instructions associated with the function to generate a modified instruction, wherein the single instruction or the set of instructions are a number of bytes and are enabled using an atomic compare and swap mechanism of a processor to perform the hooking, and wherein the location adjacent to the user-mode process in the memory is within a range determined based on an amount of the number of bytes used to specify an offset;
executing the modified instruction to jump to the location adjacent to the user-mode process in the memory;
executing the stored instructions to request loading of the user-mode component to receive data associated with the function, wherein the user-mode component executes in a user-mode of the computing device;
receiving the data at the user-mode component; and
sending, by the user-mode component, the data to the kernel-mode component to monitor, based on the data received from the user-mode component, activity on the computing device as part of a security service.

5. The computer-implemented method of claim 4, further comprising receiving notification of loading of the user-mode process and performing the identifying, the storing, and the hooking responsive to the notification.

6. The computer-implemented method of claim 4, wherein the identifying and the storing are performed by the kernel-mode component and the hooking is performed by the user-mode component.

7. The computer-implemented method of claim 4, further comprising restoring, by the user-mode component, the single instruction or the set of instructions associated with the function to an original state upon unloading of the user-mode component.

8. The computer-implemented method of claim 4, wherein the number of bytes of the single instruction or the set of instructions are eight bytes.

9. The computer-implemented method of claim 4, wherein the stored instructions are a thunk which requests loading of the user-mode component to receive the data.

10. The computer-implemented method of claim 4, wherein the function is a function of a 32-bit system library component of the user-mode process on 32-bit devices, or a 64-bit system library component of the user-mode process on 64-bit devices.

11. The computer-implemented method of claim 4, further comprising providing the (APC to be executed by the user-mode process while the user-mode process is loading, wherein timing of the providing is set to a specified stage in the loading of the user-mode process.

12. A non-transitory computer-readable medium having a plurality of programming instructions of a kernel-mode component stored thereon which, when executed by a computing device in a kernel-mode of the computing device, monitors activity on the computing device as part of a security service by causing the computing device to perform operations comprising:
  receiving, by the kernel-mode component, notification of a request to load a user-mode process;
  building, by the kernel-mode component, an asynchronous procedure call (APC) to be executed by the user-mode process while loading, the APC including:
    a user routine which calls one or more instructions for loading a user-mode component and enabling the user-mode component to hook a function of the user-mode process, wherein the user-mode component executes in a user mode of the computing device; and
    a kernel routine which calls one or more other instructions for allocating a portion of memory of the computing device as an allocated portion of the memory at a location adjacent to the user-mode process in the memory, and for storing first instructions in the allocated portion of the memory, the first instructions for loading the user-mode component and enabling the user-mode component to receive data associated with the function after the function is hooked;
  providing, by the kernel-mode component, the APC to the user-mode process;
  modifying, by the user-mode component, and based at least in part on execution of the one or more instructions for the loading of the user-mode component, a single instruction or a set of instructions associated with the function in order to generated a modified instruction that results in the function being hooked, wherein the single instruction or the set of instructions are a number of bytes and are enabled using an atomic compare and swap mechanism of a processor to hook the function, and wherein the location adjacent to the user-mode process in the memory is within a range determined based on an amount of the number of bytes used to specify an offset;
  executing the modified instruction to jump to the allocated portion of the memory;
  executing the first instructions stored in the allocated portion of the memory to request loading of the user-mode component to receive the data associated with the function;
  receiving the data at the user-mode component; and
  receiving, by the kernel-mode component, and from the user-mode component, the data associated with the function to monitor the activity on the computing device.

13. The non-transitory computer-readable medium of claim 12, wherein the receiving the notification comprises receiving the notification from a callback interface of an operating system kernel of the computing device.

14. The non-transitory computer-readable medium of claim 12, wherein timing of the providing is set to a specified stage in the loading of the user-mode process.

15. The non-transitory computer-readable medium of claim 12, wherein the user-mode component is included in a list of known library components.

16. The non-transitory computer-readable medium of claim 12, wherein the building and the providing are repeated for multiple functions of the user-mode process.

17. The non-transitory computer-readable medium of claim 12, wherein the function is a function of a 32-bit system library component of the user-mode process on 32-bit devices, or a 64-bit system library component of the user-mode process on 64-bit devices.

18. The non-transitory computer-readable medium of claim 12, wherein the operations further comprise:
  restoring, by the user-mode component, the single instruction or the set of instructions associated with the function to an original state upon unloading of the user-mode component.

* * * * *